United States Patent
Chang (10) Patent No.: US 10,320,962 B1
(45) Date of Patent: Jun. 11, 2019

(54) DUAL SCREEN SMARTPHONE AND PORTABLE DEVICES WITH A FULL DISPLAY SCREEN

(71) Applicant: ZTE Corporation, Shenzhen, Guangdong (CN)

(72) Inventor: Yong Chang, San Diego, CA (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/959,126

(22) Filed: Apr. 20, 2018

(51) Int. Cl.
 *H04M 1/02* (2006.01)
(52) U.S. Cl.
 CPC ....... *H04M 1/0266* (2013.01); *H04M 1/0264* (2013.01); *H04M 2250/16* (2013.01)
(58) Field of Classification Search
 CPC ............... H04M 1/0266; H04M 1/026; H04M 2250/22; H04M 2250/52; H04M 2250/16; H04M 1/0264; H04M 1/72522; G06F 3/0488; G06F 3/1446; G06F 3/04886; G06F 3/0482; G06F 1/1647; G06F 3/017; G06F 3/0416; G06F 3/0412; G06F 3/0481; G06F 3/14; G06F 3/147; G06F 3/048; G06F 3/04847; G06F 3/1423; G06F 3/1431; G06F 16/434; G06F 3/1204; G06F 3/1208; H04N 21/4532; H04N 21/4316; H04N 21/47217; H04N 1/00307; H04N 21/42224; H04N 21/4223; H04N 21/4307; H04N 5/225; H04N 5/23212; H04N 5/232127; H04N 5/23216; H04N 5/23232; H04N 5/23296; H04W 4/00
 See application file for complete search history.

(56) References Cited

U.S. PATENT DOCUMENTS

| | | | | |
|---|---|---|---|---|
| 2003/0115490 A1* | 6/2003 | Russo | ................ | G06K 9/00026 726/5 |
| 2005/0140574 A1* | 6/2005 | Tamura | ................ | G06F 1/1616 345/9 |
| 2008/0002982 A1* | 1/2008 | Hsueh | ................ | G06F 1/1626 398/130 |
| 2011/0134269 A1* | 6/2011 | Kim | ................ | H04N 5/23219 348/222.1 |
| 2011/0199361 A1* | 8/2011 | Shin | ................ | G06F 1/1616 345/211 |
| 2013/0235245 A1* | 9/2013 | Eaton | ................ | H04N 5/23219 348/333.01 |
| 2014/0035794 A1 | 2/2014 | Chen | | |

(Continued)

OTHER PUBLICATIONS

Boxall, A., "Xiaomi Mi Mix 2 review," Digital Trends, Jan. 2018 <https://www.digitaltrends.com/mobile/xiaomi-mi-mix-2-review>.

(Continued)

*Primary Examiner* — Daniel Lai
(74) *Attorney, Agent, or Firm* — Perkins Coie LLP (57) ABSTRACT

Disclosed are dual screen smartphone devices with a high resolution full screen display. In some aspects, a dual display smartphone device includes a first display screen on a first face of the smartphone device operable to provide a high resolution, fully viewable visual display that occupies substantially 100% of the surface area of the first face; a second display screen on a second face of the smartphone device operable to provide a high resolution visual display while providing space for placing one or more cameras and sensors on the second face.

24 Claims, 8 Drawing Sheets

(56) References Cited

U.S. PATENT DOCUMENTS

2014/0310643 A1* 10/2014 Karmanenko ........ G06F 1/1626
715/784
2017/0153669 A1* 6/2017 Wang ........................ G09F 9/33
2017/0220842 A1* 8/2017 Thompson ............ G06F 3/0416

OTHER PUBLICATIONS

Brownlee, M., "Xiaomi Mi Mix 2: The BezeHess Sequel!," YouTube Video, Sep. 2017, <https://www.youtube.com/watch?v=iOnNXJs6FUU>.

Gizok, "Yotaphone 3 Hands On, Review," YouTube Video, Sep. 2017, <https://www.youtube.com/watch?v=QECPuVXvd2s>.

Heater, B., "ZTE's dual-screen phone is a fascinating mess," Dec. 2017, <https://techcrunch.com/2017/12/19/ztes-dual-screen-phone-is-a-fascinating-mess/>.

Stinson, E., "When One Screen Isn't Enough, Try Meizu's Two-Screen Phone," Wired Magazine, Jul. 2017, <https://www.wired.com/story/when-one-screen-isnt-enough-try-meizus-two-screen-phone/>.

* cited by examiner

DUAL SCREEN SMARTPHONE AND PORTABLE DEVICES WITH A FULL DISPLAY SCREEN

TECHNICAL FIELD

This patent document relates to portable devices and mobile computing and communication devices such as smartphones.

BACKGROUND

A cellular phone, or cell phone, is a portable, mobile telephone which uses a wireless cellular network to transmit and receive calls. Cell phone technology has advanced to include data communications for various services, including short message service (SMS) or text messages, Internet connectivity, and other data services. Wireless cellular networks today provide coverage to almost all areas where humans can reach. Even in remote areas, it is not uncommon to find wireless connectivity for data and voice communications. Innovations to cell phones continue to increase the demands on the wireless cellular networks in terms of the bandwidth and other services, and on the hardware of the cell phone devices to perform multiple functions for the user.

SUMMARY

Disclosed are smartphone devices having dual displays including a first display screen on a first face of the smartphone providing a high resolution, fully viewable visual display that occupies substantially 100% of the surface area of the first face, and a second display screen on a second face of the smartphone providing a high resolution visual display while providing space for placing one or more cameras and sensors on the second face.

In some aspects, the disclosed technology can be implemented to provide a dual display device that includes a first display screen fixed in position on a first face of the device and a second display screen fixed in position on a second face of the device. The first display screen is structured to occupy substantially 100% of the surface area of the first face without leaving a space for placing a camera or a sensor outside the first display screen on the first face, and to provide a high resolution, fully viewable visual display for displaying images and providing touch sensing operations. The second display screen is structured to occupy less than 100% of the surface area of the second face to provide one or more surface areas on the second face for holding sensor devices including a camera for capturing photos and videos, and to provide a fully viewable visual display for displaying images and providing touch sensing operations. A controller is coupled to control operations of the device including displaying and touch sensing operations on the first and second display screens, and is operable to provide touch sensing operations on the first and second display screens to control the camera on the second face by using the first display screen as a live viewfinder in capturing a photo or video by the camera in a point-and-shoot camera operation and by using the second display screen as a live viewfinder in capturing a photo or video by the camera in a selfie camera operation.

In some aspects, the disclosed technology can be implemented to provide a method for enhancing a user experience in a portable device. This method includes providing a first display screen fixed in position on a first face of the device to occupy substantially 100% of the surface area of the first face without leaving a space for placing a camera or a sensor outside the first display screen on the first face to provide a high resolution, fully viewable visual display for displaying images and to provide touch sensing operations; and providing a second display screen fixed in position on a second face of the device to occupy less than 100% of the surface area of the second face to provide one or more surface areas on the second face for holding sensor devices including a camera for capturing photos and videos, wherein the second display screen is structured to provide a fully viewable visual display for displaying images and to provide touch sensing operations. This method further includes activating the first display screen on the first face as a viewfinder for the camera on the second face to display a live view from the camera and as a touch sensing panel for a user to control the camera including composing a scene while adjusting the device to aim the camera on the second face towards a target object or area in capturing a photo or video in a point-and-shoot camera operation; and activating the second display screen on the second face as a viewfinder for the camera on the second face to display a live view from the camera and as a touch sensing panel for a user to control the camera including composing a scene while adjusting the device to aim the camera on the second face towards a target object or area in capturing a photo or video in a selfie camera operation.

The above and other aspects of the disclosed technology and their implementations are described in greater detail in the drawings, the description and the claims.

BRIEF DESCRIPTION OF THE DRAWINGS

The various features of the drawings may not be drawn to-scale. The dimensions of the various features depicted in the drawings may be arbitrarily expanded or reduced for clarity.

DETAILED DESCRIPTION

A smartphone is type of cellular telephone with an integrated computer for implementing a variety of computing and communication tasks beyond traditional cellular voice calls, such as SMS and Internet data communications and multi-media data processing, acquisition, display, and storage. For example, smartphones operate numerous types of software application programs, known as "apps", which service various purposes including but not limited to entertainment, news, maps, event calendars, web browsers, smartphone settings, and utility functions like operating hardware features of the smartphone like a camera, display, microphone, etc. Smartphone users have come to rely on their smartphone for nearly all aspects of their lives, such as for business, education, health and other uses. The primary way users interact with their smartphone is through the visual display of the device, i.e., the display screen.

Smartphone display screens are one of the crucial parts of smartphone devices. In addition to fast data processing speed and sufficient data storage capabilities, users want to be able to view all visual media on their smartphone. Example display screens on smartphones include liquid-crystal displays (LCDs) that use backlighting light to illuminate LCD pixels to produce colored images, light-emitting pixel screens where each pixel generates colored light without backlighting such as organic light-emitting diode (OLED) displays including active-matrix OLED displays, and other display types like electronic ink (E ink) screens. On one hand, there is a user demand for larger screens for viewing video and captured images using the smartphone camera or for viewing or editing documents, which were traditionally tasks performed on a personal desktop or laptop computer. On the other hand, however, there is also a user demand for compactness of smartphones to be easily portable. The meet the above two different user demands, various smartphone designs are geared towards providing a reasonably large display screens while minimizing the size of the smartphone. One of the approaches is to balance the competing demands to maximize the screen size on a given phone surface.

In many smartphone designs, a single large display screen is implemented on a front side or surface of the smartphone and such a display screen is usually designed to occupy the most space on the front surface to maximize the display area of the display screen while leaving some surface area for placing certain sensors. One of the sensors placed on the front surface along with the display screen is the front-facing camera for various operations including taking selfie photos by the user while using the display screen on the same front surface as an image viewfinder for orienting the front-facing camera in a desired position for taking a photo or a video clip. A second, rear-facing camera may be implemented in various smartphones on an opposing, rear surface which usually does not contain a display screen. Such a second, rear-facing camera is operated by the user by looking at the display screen on the front side as a viewfinder in capturing a photo or a video clip. To maximize the screen size of the single display screen on the front surface, various designs attempt to reduce the number of sensors that share the front surface with the display screen. However, certain sensors must be present on the front surface in such phone designs such as the front-facing camera so that the display screen cannot occupy 100% of the front surface out of the necessity.

Figure 1A:
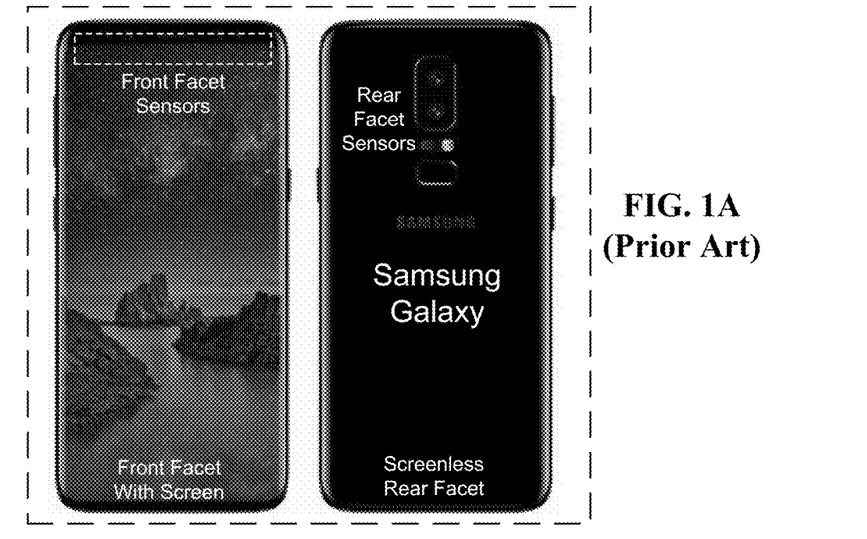
FIGS. 1A-1C show examples of existing smartphones with a large main display screen.
Figure 1B:
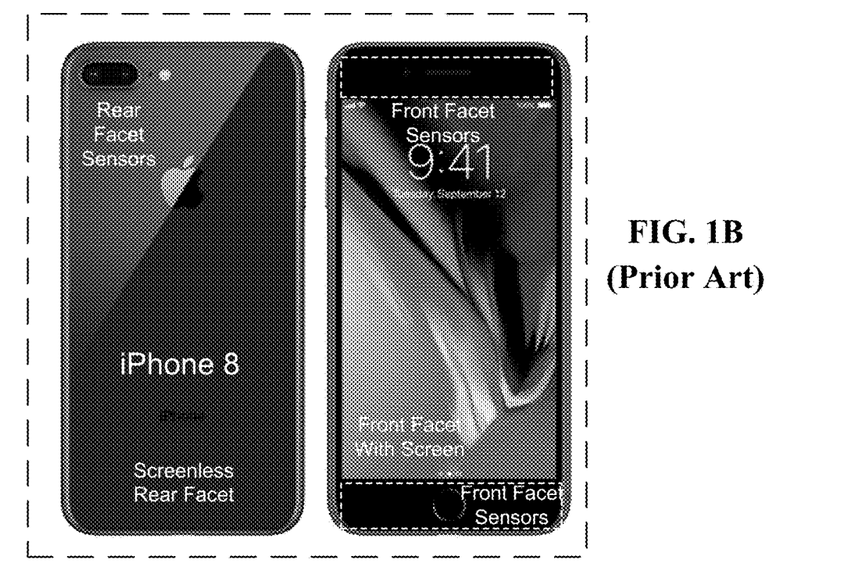
Figure 1C:
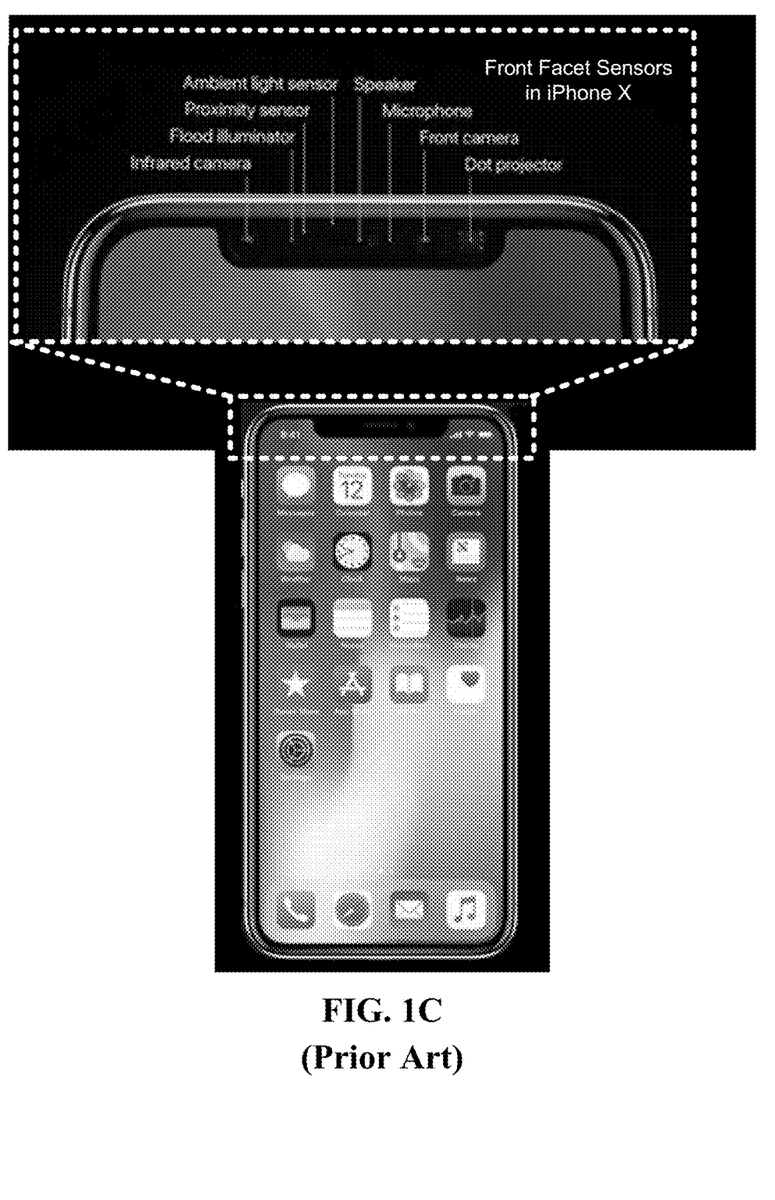

FIGS. 1A-1C show examples of existing prior art smartphones with a single large main display screen on one surface.

FIG. 1A shows the front and back faces of a Samsung Galaxy model, which the front face or surface has a large screen with an occupation of about 90% of the front face. One or more sensors (including the front-facing camera for taking selfie photos or video) take a very small portion of the front surface, usually at a peripheral area such as the marked peripheral area on the top of the front surface in FIG. 1A. FIG. 1A further shows a portion of the opposing, rear surface or face of the Samsung phone which contains a rear-facing camera with a dual-lens design, a fingerprint sensor, and others (e.g., an LED illumination light). Both the front-facing and rear-facing cameras are operated by using the same display screen on the front surface as the viewfinder for capturing photos or videos.

FIG. 1B shows the front and back faces of an Apple iPhone 8 model, which the front face has a screen occupation percentage of less than 80% due to presence of a first top peripheral area for placing the front-facing camera and other sensors such as the ambient light sensor, proximity sensor and a second bottom peripheral area for placing a fingerprint sensor based on capacitive sensing. FIG. 1B further shows the opposing, rear surface or face of the same iPhone 8 model which contains a rear-facing camera with a dual-lens design, an LED illumination light, and others. Similar to the Samsung phone in FIG. 1A, both the front-facing and rear-facing cameras are operated by using the same display screen on the front surface as the viewfinder for capturing photos or videos.

The above basic surface layout design features are also present in the Apple iPhone X. FIG. 1C shows the front face of an Apple iPhone X which has a large display screen with a screen occupation percentage of about 90% because the top marked peripheral front surface is used for placing for placing the front-facing camera and other sensors such as modules for Apple's face recognition system with an infrared dot projector, a front-facing infrared camera and an infrared flood illumination light for illuminating a face in the dark. The opposing, rear surface or face of the same iPhone X model contains a rear-facing camera, an LED illumination light, and others. Similar to the Samsung phone and iPhone 8, both the front-facing and rear-facing cameras in iPhone X are operated by using the same display screen on the front surface as the viewfinder for capturing photos or videos.

The above and other smartphone designs based on a single screen design need to place both the display screen and some sensors on the same surface in part due to the overall designs that must accommodate and support certain structural and functional features of the device on the same surface where the display screen is located and the reliance on the single large screen for various operations (e.g., operating both the front and rear facing cameras for taking photos or videos). As a result, while the display size can be increased while minimizing the occupation area by other sensors on the same surface, it is not possible to allocate the entire surface to the display screen with a screen occupation rate at 100%.

Some existing smartphones are designed to provide two display screens that fold or slide outward to offer larger viewing areas while compensating for the placement of critical components needed for usability, such as buttons, fingerprint sensors, cameras, sensors, etc. As such, a variety of different display screen configurations exist with 55% to 90% of screen occupation percentage on such dual-screen smartphones due to various requirements including the sharing of a surface by a display screen and one or more sensors or other structures on the same surface.

Therefore, existing smartphones with a single screen or two screens have not been able to provide a true "full screen" that has a substantially 100% occupation percentage of the side's surface area.

This patent document discloses dual-screen smartphone designs that place two different display screens on two opposing first and second surfaces of a smartphone so that a first display screen is placed on the first surface to fully occupy the first surface without leaving space on the first surface outside the first display screen for other sensors or components (such as a camera) and a second smaller display screen is placed on the second surface to occupy a part of the second surface while leaving a portion of the second surface outside the second display screen for placing one or more cameras or other sensors or components. Such designs having a full first display screen on the first surface and a large second display screen on the second surface enable a user to have the first display screen to enjoy a maximum display area possible on the smartphone that is not possible with other smartphone designs while using the combination of the first and second display screens, one or more cameras and sensors on the second surface to provide a wide range operations. For example, the disclosed dual screen designs can allow a user to operate one camera on the second surface outside the second display screen for taking both selfie photos or videos by pointing the camera towards a user while allowing the user to use the second display screen as a viewfinder during the selfie mode and can also allow the user to use the same camera to point to a scene away from the user while using the first display screen as a viewfinder in aiming the camera and capturing photos or videos.

In comparison with other dual-screen smartphone designs, the disclosed dual-screen smartphone designs in this patent document provide a full first display screen on the first surface and a sufficiently large second display screen on the second surface to integrate the first and second screens on two fixed opposing surfaces of smartphones and to eliminate the need for a complex phone packaging design that uses a slide panel or a folding panel for a second screen.

Figure 2A:
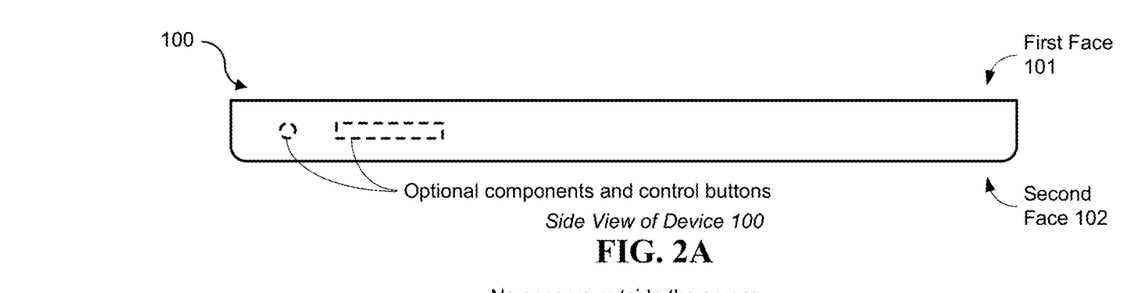
FIGS. 2A-2C show diagrams of an example embodiment of a dual display smartphone device in accordance with the present technology.
Figure 2B:
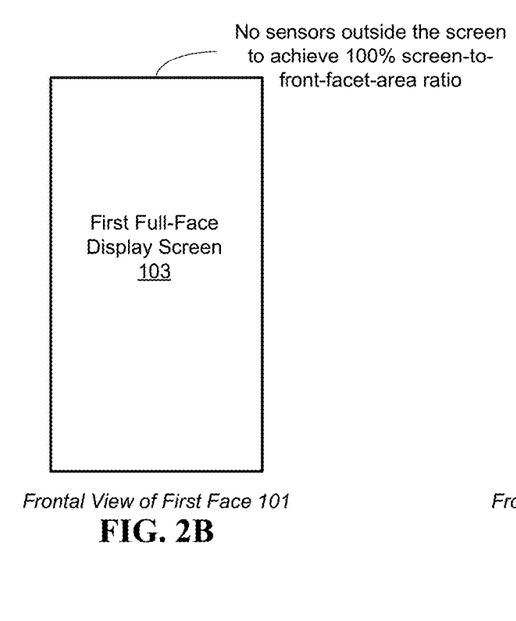
Figure 2C:
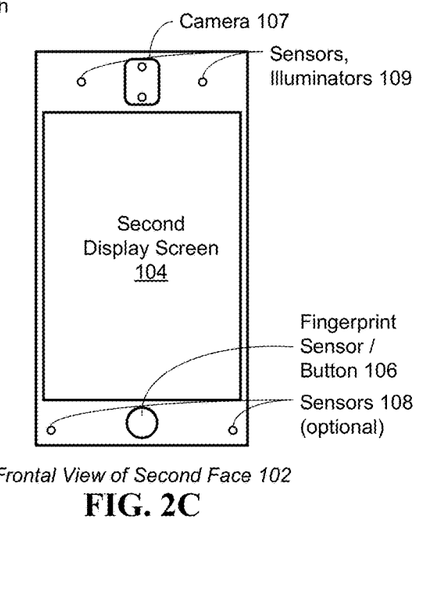

FIGS. 2A-2C show examples of a dual display smartphone device 100 based on the disclosed dual-screen designs. FIG. 2A shows a side view of the example dual display smartphone device 100. FIG. 2B shows a frontal view of one face of the example dual display smartphone device 100, and FIG. 2C shows the other face of the example dual display smartphone device 100. The smartphone device 100 includes a first display screen 103 on a first face 101 of the smartphone that provides the device 100 with a high resolution, fully viewable visual display screens that occupies substantially 100% of the surface area of the first face 101. Under this design, the first display screen 103 fully occupies the entirety of the available surface area on the first face 101 to maximize the display area without leaving space outside the first display screen 103 on the first face 101 for holding sensors or other components. However, any sensors that can be implemented within the display screen area without affecting the displaying operation of the screen may be provided. For example, a touch sensing panel assembly is integrated as part of the first display screen 103 to enable touch sensing operations at the first display screen 103 similar to other touch sensing display screens. For another example, a high quality image camera with a zoom lens assembly is usually difficult to place on the first face 101 and thus is placed on a second face 102 on the opposite side of the smartphone device 100.

On the second face 102 on other side of the smartphone device 100, a number of devices or components can be placed. A second display screen 104 is placed on the second face 102 to provide a high resolution visual display screen, and occupies a portion of the surface area of the second face 102, e.g., at least 50% in some implementations to achieve a reasonably large display area for the second display screen 104. In some embodiments, the second display screen 104 occupies at least 75% of the surface area of the second face 102, whereas in some embodiments, the second display screen 104 occupies up to 90% of the second face 102. In various embodiments of the dual display smartphone device 100, the first display screen 103 and the second display screen 104 are configured as high resolution (e.g., at least 720×1280 pixels), color, touch screen displays. The area outside the second display screen 104 on the second face 102 can be used to place one or more sensors, one or more cameras, control buttons or other structures that cannot be placed on the first face 101 due to the full occupation of the first display screen 103. Like the first display screen 103, the second display screen 104 is a touch sensing display screen to enable a user to perform touch sensing operations.

In the specific examples of the dual-screen smartphone in FIGS. 2A-2C, the dual display smartphone device 100 includes a camera 107 arranged on the second face 102 at a location outside the second display screen 104, e.g., proximate the second display screen 104. The imaging lens assembly of the camera 107 is positioned to face away from the second face 102 and, in some implementations, may include one or more optical imagers. In some implementations, illuminators and/or sensors may also be included in the camera 107 for capturing images or videos. The camera 107 can be designed as a compact high-quality camera with a zoom lens assembly to provide zooming operation and to capture high resolution and high quality images and videos while the first or second display screen 104 simultaneously displays a captured images or video.

In some embodiments, for example, the dual display smartphone device 100 includes one or more various sensors or functional structures 106, 108 and 109 outside of the second display screen 104 at in one region or in different regions on the second face 102, e.g., optical sensors and/or illuminators 109 disposed on the second face 102 to measure light (e.g., ambient light, infrared light, ultraviolet light, or other) and/or project visible light, respectively. For example, the optical sensors and/or illuminators 109 can be used in conjunction with various applications or components of the smartphone, including but not limited to image capture of still images or video, e.g., to analyze ambient environment and illuminate the environment for improved image quality. The dual display smartphone device 100 can include other sensors that can be physically arranged on or about the second face 102, or inside the smartphone. For example, a fingerprint sensor 106 may be located on the second face 102, e.g., at a location outside the second display screen 104. For another example, a face recognition system may be placed on the second face 102 which may include an infrared dot projector, an infrared camera and an infrared flood illumination light for illuminating a face in the dark. Other example sensors include, but are not limited to, accelerometer(s), gyroscope(s), digital compass, proximity sensor(s), or others. In some embodiments, the dual display smartphone device 100 includes one or more speakers and microphones (e.g., the major microphone) on the side edges, whereas in some implementations, at least some speakers and microphones can be disposed on the second face 102.

In some embodiments, the first display screen 103 is structured on the first face 101 of the smartphone 100 without a bezel, as illustrated in the side view of the diagram of FIG. 2A. Depending on the geometry of the smartphone device 100, the first display screen 103 may have veracious configurations. For example, in some embodiments, the first display screen 103 includes an 18:9 aspect ratio, e.g., such as for a 5.5-6.5 inch screen size (diagonal). In some embodiments, the second display screen 104 includes a 11:7 aspect ratio, e.g., such as for a 3.5-5.5 inch size screen (diagonal), located in a substantially centered location on the second face 102 and surrounded by other components such as the camera unit 107, ambient light sensors and infrared sensors, fingerprint sensors, light illuminators, one or more speakers, one or more microphones, and the like. For example, on one end (e.g., top) of the second display screen 104 on the second side 102, the camera 107, an optical sensor, an infrared sensor and ambient light illuminator, and a primary speaker can be positioned, and on the opposite end (e.g., bottom) of the second display screen 104 on the second face 102, additional light sensors and illuminators and the primary microphone can be positioned. Speakers and microphones can additionally or alternatively be positioned on one or more sides of the smartphone device 100. Similarly, for example, control buttons, e.g., such as power on/off, volume controls, and the like, can be positioned on one or more sides of the smartphone device 100.

The dual display smartphone device 100 includes a data processing unit, including a processor and a memory, to process and store data and control operations associated with the components and software applications of the smartphone.

In implementations, for example, the second display screen 104 may serve several initial or basic functions of the smartphone, e.g., such as the user unlocking the smartphone with a fingerprint and/or a face ID recognition, making a phone call, and taking a selfie picture. The first display screen 103 can provide a premium viewing experience for enjoying video, pictures and reading books, documents and other files while also providing other operations via the touch sensing control operations such as launching an App, navigating through different displayed pages, or other touch sensing controlled operations. Also, for example, regular photos can be displayed on the entire face of the smartphone via the first display screen 103, e.g., 100% view area over the smartphone's complete area and aspect ratio, as compared to 65% to 90% screen ratio for state-of-the-art conventional smartphones with a single display.

Moreover, the dual display smartphone device 100 can allow a single camera on the second face 102 that is operational for both back and front imaging applications, e.g., regular point-and-shoot image capturing and selfies. Having a single camera reduces the overall bill of material (BOM) and manufacturing costs the smartphone without sacrificing user experiences, and rather, enhancing the user experiences. Furthermore, the configuration of the dual display smartphone device 100 reduces or removes complexities with operations of a back screen, e.g., by incorporating a fingerprint sensor, camera sensor and other IR sensors to a single panel.

Notably, the design shown in FIGS. 2A-2C provides all out-of-display sensors, control buttons and other structures on the second face 102 to free up the entire surface space of the opposing first face 101 for the first display screen 103 without the need for using any space outside the first display screen 103 so that the first displays screen 103 can be occupy 100% of the available surface to maximize the screen size and to enhance the user viewing experience that is not available in other smartphone designs. Due to the presence of the full first display screen 103 on the first face 101, the space allocation for the second display screen 104 and other out-of-screen sensors and structures on the second face 102 becomes more flexible in part because the second display screen 104 can be smaller than the full first display screen 103 while still meeting the user's desire for a large high resolution display via the first displays screen 103 and in part because the second display screen is designed to provide full touch sensing and display operations while providing valuable surface space on the second face 102 for important sensors that need to be on the same surface with a display screen such as a camera for selfie imaging operations, and a face ID imaging module that operates in connection with a display screen on the same face. Due to the availability of additional surface space on the second face 102 provided by a less-than-full surface display screen 104, a camera on the second face 102 can be implemented with a high imaging quality camera equipped with a zoom lens assembly with a larger optical aperture for both selfie and regular point-and-shoot imaging applications. In addition, the present design is based on the recognition that two display screens 103 and 104 consume more power than one screen and the need for longer operation times is one important user demand for smartphones. In this regard, the presence of the full first display screen 103 on the first face 101 with the highest display imaging quality in brightness, resolution and color rendition allows the second display screen 104 to be implemented by a more energy efficient display screen while still providing satisfactory display performance for full smartphone operations to ensure a desired battery operating time.

The dual display smartphone device 100 allows the user to enjoy the immediate benefits of two screens, as well as introduce new multi-tasking activities not available on existing smartphones. For example, the same device can manage tasks adapted to two screens simultaneously, such as watching an entertainment program (e.g., movie, sports, news, etc.) on the 100% full screen and controlling the secondary screen to direct an action on the primary full screen, e.g., without obstructing the viewability of the content on the 100% full screen display.

In some implementations, the dual display smartphone device 100 can be configured to autonomously manage the power directed to the first display screen 103 and the second display screen 104 based on the user's grip of the smartphone device 100, e.g., as detected by the touch screens that detect precisely where and how each of the first and second display screens 103 and 104 are touched, and based on the orientation and/or movement of the smartphone device 100, e.g., as detected by the motion sensors. As an example, when the user is holding the smartphone device in a certain orientation and his/her fingers or portions of his/her hand are in contact with portions determined on the second display screen 104, then the data processing unit of the device can determine that the second display screen is not in active use by the user and thereby reduce power (e.g., reduce brightness or other display settings) or temporarily turn off the screen. And vice versa, for example, when the user is holding the smartphone device in a certain orientation and his/her fingers or portions of his/her hand are in contact with portions determined on the first display screen 103, then the data processing unit of the device can determine that the first display screen is not in active use by the user and thereby reduce power or temporarily turn off the screen.

For camera functions of taking photos or videos, the disclosed dual screen designs can allow a user to operate one camera on the second face 102 outside the second display screen 104 for taking both selfie photos or videos by pointing the camera towards a user while allowing the user to use the second display screen 104 as a viewfinder during the selfie mode and can also allow the user to use the same camera on the second face 102 to point to a scene away from the user while using the first display screen 103 as a viewfinder in aiming the camera and capturing photos or videos. Such operations using one camera with two screens on opposite sides are unique to the disclosed designs.

In comparison, other smartphones with a single display screen on one face, such as the examples of smartphones illustrated in FIGS. 1A-1C, two different cameras are provided on the two opposite faces of the smartphones for capturing photos and videos and are operated by using the same single display screen as the viewfinder for each of the two cameras on the two opposite sides of the smartphone. For example, in the smartphone example in FIG. 1A, a front facing camera located inside the marked top front face sensor zone outside the display screen is used for taking selfie photos or videos by using the display screen on the front face as a viewfinder. In a selfie imaging operation, the user holds the smart phone with the front face containing a front camera towards a user's face so the front camera captures a live image that is displayed on the display screen on the front face to allow the user to adjust the image capturing direction of the front camera on to compose an image or scene. Once the live image on the display screen shows a desired image, the user operates the camera to capture the desired image as a selfie image or video. In a regular point-and-shoot image capturing using the phone in FIG. 1A, a rear facing camera on the rear face of the smartphone is activated and is pointed by the user to a scene to capture a live image of the scene which is displayed on the display screen on the front face of the smartphone facing the user. The live image on the display screen on the front face now faces the user to act as a viewfinder for the user to adjust the pointing direction of the rear camera for a desired image. Once the live image on the display screen shows the desired image, the user operates the rear camera to capture the desired image or video. The smartphones as shown in FIGS. 1A-1C implement both front and rear cameras in order to provide the above two modes of imaging capturing.

Figure 3A:
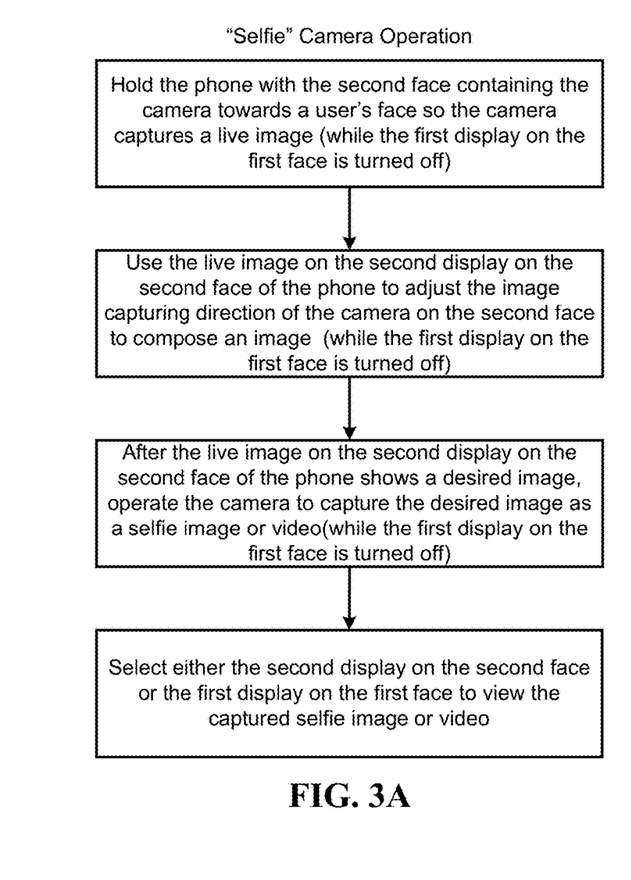
FIGS. 3A and 3B show camera operations of the dual-display smartphone in FIGS. 2A-2C by using the same camera to perform both selfie and point-and-shoot image capturing operations with two different screens as viewfinders.
Figure 3B:
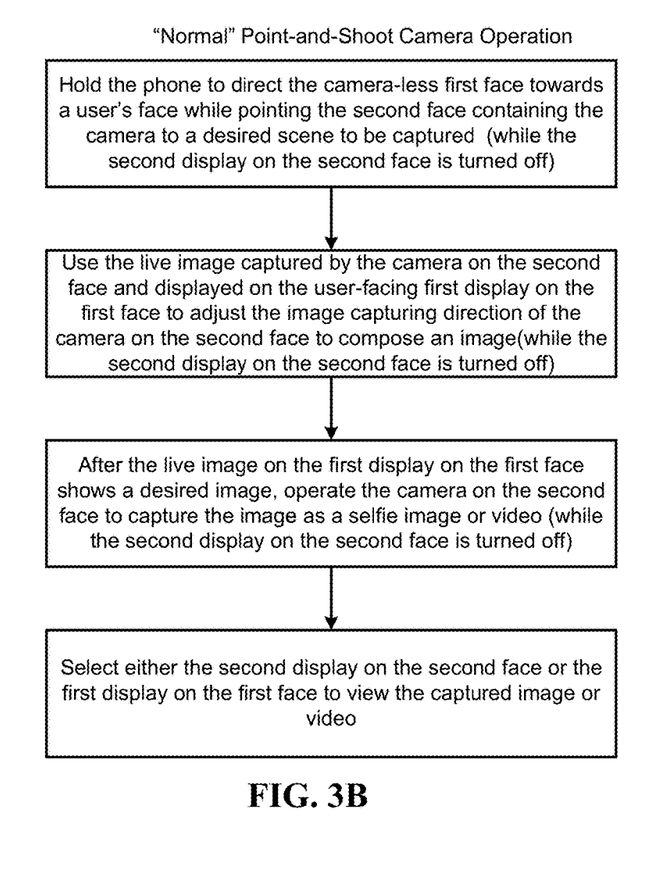

Turning to FIGS. 3A and 3B, in the dual-screen designs in this patent document, a single camera on the second face 102 can be used to perform different imaging operations by using first display screen 103 or second display screen 104.

FIG. 3A shows an example of the camera operation for taking selfie photos or videos. First, the user holds the phone with the second face 102 containing the camera 107 towards a user's face so the camera captures a live image (while the first display screen 103 on the first face 101 is turned off). Second, the user uses the live image on the second display screen 104 on the second face 102 of the phone to adjust the image capturing direction of the camera 107 on the second face 102 to compose an image (while the first display screen 103 on the first face 101 is turned off). After the live image on the second display screen 104 on the second face 102 of the phone shows a desired image, the user operates the camera 107 to capture the desired image as a selfie image or video (while the first display screen on the first face is turned off). After taking the photo or video, the user can select either the second display screen 104 on the second face 102 or the first display screen 103 on the first face 101 to view the captured selfie image or video. This operation is similar to taking selfie photos or videos with the conventional phones in FIGS. 1A-1C.

However, the dual-screen designs in this patent document offer a different image capturing operation in a regular point-and-shoot image capturing. Referring to FIG. 3B with a reference to FIGS. 2A-2C, the user holds the phone to direct the camera-less first face 101 towards a user's face while pointing the second face 102 containing the same camera 107 used in the selfie mode as shown in FIG. 3A to a desired scene to be captured (while the second display screen 104 on the second face 102 is turned off). The user uses the live image captured by the camera 107 on the second face 102 and displayed on the user-facing first display screen 103 on the first face 101 to adjust the image capturing direction of the camera 107 to compose an image (while the second display screen 104 on the second face 102 is turned off). After the live image on the first display screen 103 on the first face 101 shows a desired image, the user operates the camera 107 to capture a photo or video (while the second display screen 104 on the second face 102 is turned off). After taking the photo or video, the user can select either the second display screen 104 on the second face 102 or the first display screen 103 on the first face 101 to view the captured image or video. This operation is different from taking photos or videos with the conventional phones in FIGS. 1A-1C.

In implementations, a controller or processor is provided inside the smartphone device 100 to control operations of the dual display smartphone device 100 including displaying and touch sensing operations on the first and second display screens 103 and 104. For example, the controller is operable to provide touch sensing operations on the first and second display screens to control the second side camera by using either of the first and second display screens as a live viewfinder in capturing a photo or video.

The disclosed smartphone devices achieve the 100% screen occupation percentage without sacrificing important smartphone capabilities, such as the ability to take self images ("selfies"); make phone calls, receive phone calls and clearly communicate with interlocuters during the calls; view video streams with surround sound; and recognize face ID or fingerprint ID from users to operate the smartphone. Example embodiments of the dual screen smartphone devices herein disclose the structural and functional features of the device that provides the advantages that allow for improved and new uses of the smartphone with respect to the conventional smartphones discussed above.

Figure 4A:
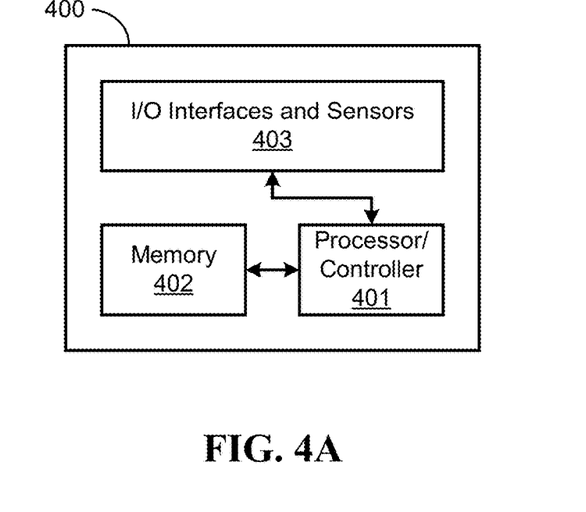
FIGS. 4A and 4B show examples of data processing unit and the wireless transceiver part of a dual display smartphone device in FIGS. 2A-2C.

FIG. 4A shows a block diagram of an example embodiment of the data processing unit 400 of the dual display smartphone device disclosed in this patent document. The data processing unit 400 includes a processor or controller 401 to process data, and memory 402 in communication with the processor 401 to store and/or buffer data. For example, the processor 401 can include a central processing unit (CPU) or a microcontroller unit (MCU). In some implementations, the processor 401 can include a field-programmable gate-array (FPGA). In some implementations, the data processing unit 400 includes or is in communication with a graphics processing unit (GPU), video processing unit (VPU) and/or wireless communications unit for various visual and/or communications data processing functions of the smartphone device. For example, the memory 402 can include and store processor-executable code, which when executed by the processor 401, configures the data processing unit 400 to perform various operations, e.g., such as receiving information, commands, and/or data, processing information and data, and transmitting or providing processed information/data to another device, such as an actuator or external display. To support various functions of the data processing unit 400, the memory 402 can store information and data, such as instructions, software, values, images, and other data processed or referenced by the processor 401. For example, various types of Random Access Memory (RAM) devices, Read Only Memory (ROM) devices, Flash Memory devices, and other suitable storage media can be used to implement storage functions of the memory 402. In some implementations, the data processing unit 400 includes an input/output (I/O) unit 403 to interface the processor 401 and/or memory 402 to other modules, units or devices. For example, the I/O unit 403 can interface the processor 401 and memory 402 with the wireless communications unit of the smartphone device, e.g., to utilize various types of wireless interfaces compatible with typical data communication standards, which can be used in communications of the data processing unit with other devices, e.g., such as between the one or more computers in the cloud and the user device. In some implementations, the data processing unit 400 can interface with other devices using a wired connection via the I/O unit 403. The data processing unit 400 can also interface with other external interfaces, sources of data storage, and/or visual or audio display devices, etc. to retrieve and transfer data and information that can be processed by the processor, stored in the memory, or exhibited on an output unit of a display device or an external device.

Figure 4B:
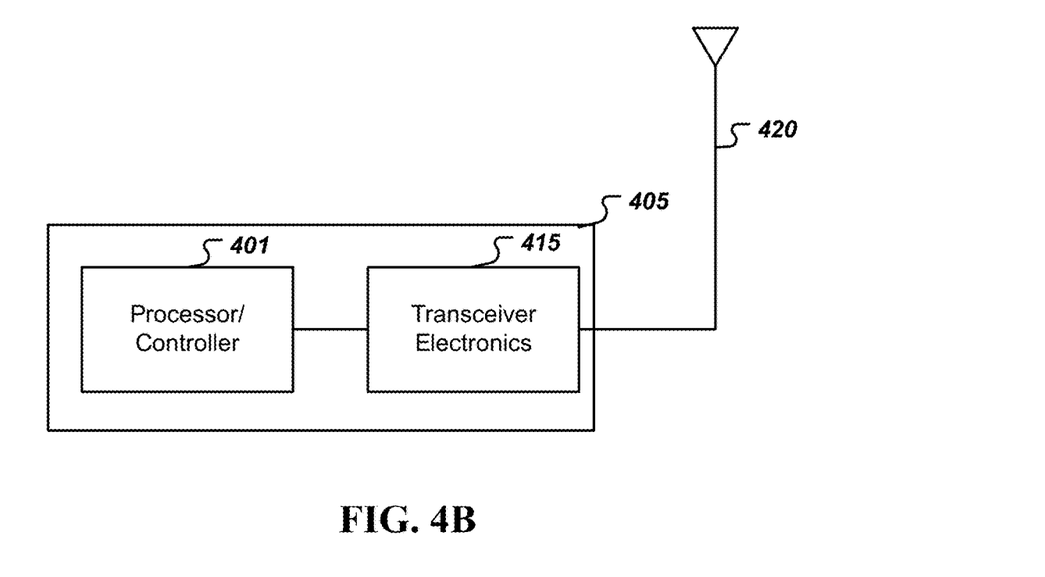

FIG. 4B is a block diagram representation of a portion of a radio transceiver 405 for a smartphone. A radio transceiver 405 can include a processor/controller 401 such as a microprocessor that implements control functions for communication operations of the smartphone. The radio transceiver 405 can include transceiver electronics 415 to send and/or receive wireless signals over one or more communication interfaces such as one or more antennas 420. Such wireless communications can be via the broadband wireless channels such as 4G-LTE, 5G or other suitable mobile communication protocols or additional RF wireless interfaces such as WiFi, Bluetooth and others. The radio transceiver 405 can include other communication interfaces for transmitting and receiving data. Radio transceiver 405 can include one or more memories configured to store information such as data and/or instructions. In some implementations, the processor/controller 401 can include at least a portion of the transceiver electronics 415.

Figure 5:
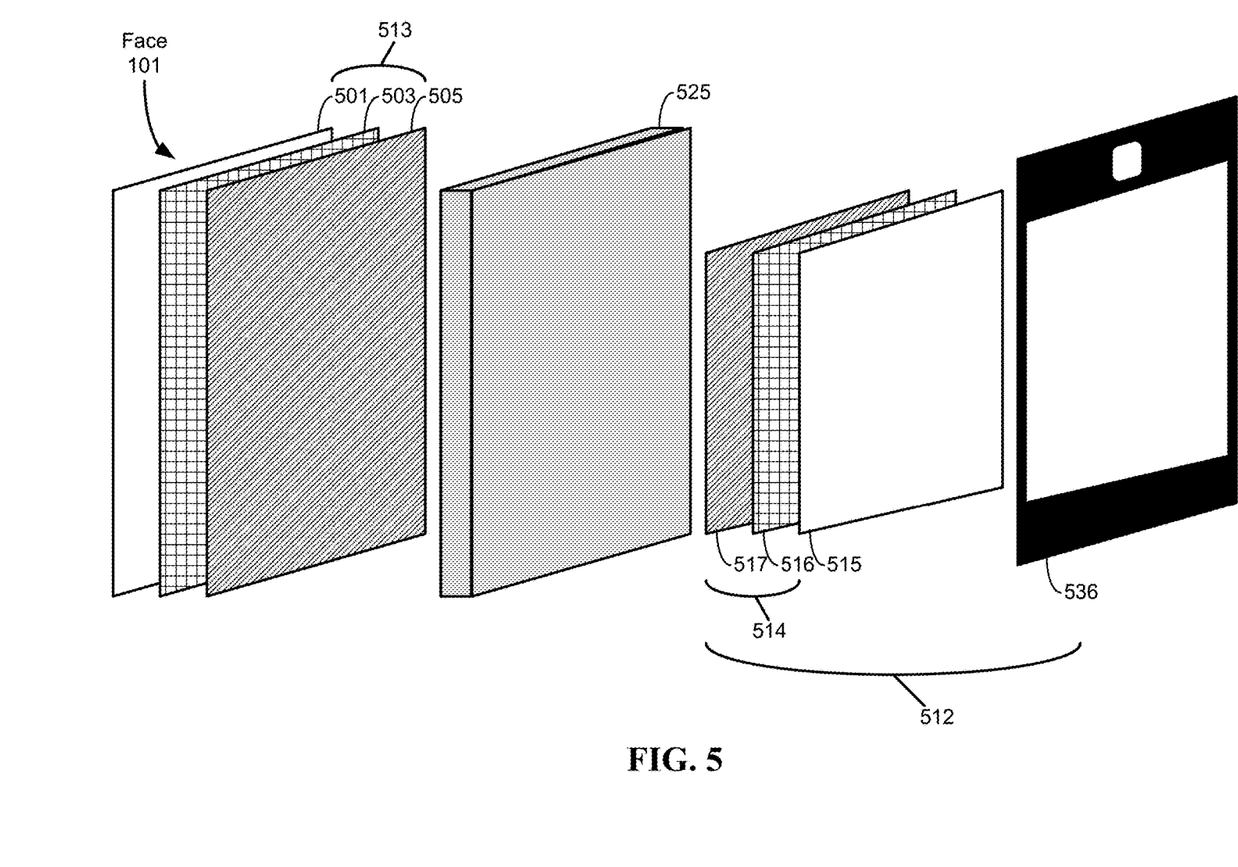
FIG. 5 shows a block diagram of an example of the dual display smartphone device.

FIG. 5 shows a block diagram of an example of the dual display smartphone device 100 in FIGS. 2A-2C. The smartphone device 100 includes a first touch screen display assembly 513 structured to occupy the entire area of the first face 101 and includes an outer transparent layer 501 such as a top glass layer, and a composite assembly 503 that combines a touch sensing assembly and a display assembly (e.g., LCD or OLED) that displays images. An electronics interface module 505 is provided to provide links and commutations between the touch screen display assembly 513 and a components layer 525, positioned underneath the first touch screen display assembly 513. The components layer 525 can include one or more layers of microchip sets including the data processing unit 400 (e.g., system on a chip (SoC), comprising the central processor 401, memory 402 and/or I/O 403, and other chipsets such as a graphics processing unit (GPU), wireless communication modem, display processor, and/or video processor); sensor units such as motion sensors, proximity sensors, position sensors, and the like; power unit (e.g., battery); components of the camera 107 and the optical sensors and/or illuminators 109; and/or other components and modules. The components layer 525 is in communication with a second outer layer 512 that includes a casing or housing 536 and a second touch screen display assembly 514, which can fit in openings in the housing 536 on the second face 102 and be of a size that occupies a significant portion of the surface of the second face 102, such as between 50% to 90%, as an example. For example, the touch screen display assembly 514 can include a display cover 515 such as a transparent and insulative or dielectric material (e.g., cover glass), a composite assembly 516 that combines a touch sensing assembly and a display assembly (e.g., LCD or OLED) that displays images and an electronics interface module 517 in communication with the display microchip sets of the components layer 525.

The smartphone device 100 in FIGS. 2A-2C can be implemented in various ways using the dual high resolution screen configuration with one 100% full screen, which create several advantages of the device itself and for its user. For example, the smartphone device 100 provides a 100% full screen for interactive use of the smartphone device 100, e.g., viewing images, watching video, reading documents, etc., while also providing an available high resolution camera proximate a secondary high resolution screen that has sufficient occupation percentage. For example, the side of the smartphone device 100 having the smaller secondary screen can also include sensors that improve a selfie image, allowing the user to take a high resolution selfie image using the high resolution camera. In contrast with conventional smartphone devices that have two cameras on opposing sides, for example, the smartphone device 100 can utilize a single high resolution camera for every kind of image, e.g., allowing for high resolution selfies. For example, the smaller screen can also have dual camera sensor to take better selfie to know where the user is.

In some implementations of the dual display smart devices such as smartphone device 100, the two available screens enables the on-board software controls to operate two apps at the same time and display their presentations simultaneously on the two different displays. The example smartphone device 100 allows for screen swapping, for example, in which a user may stream video content or display other visual data on one screen (e.g., first full-face display screen 103) and operate another app, such as a texting app, document editing app, email app, stream video, etc., on the opposite-side screen (e.g., second display screen 104) to optimize their usage of each operating app. In an illustrative example, the device 100 allows a user to stream a video using a first app (e.g., a TV or movie content app) on the full-face display screen 103 and text with a person (e.g., family, friend, colleague, etc.) on the second screen 104 simultaneously, such that, when an advertisement is played on the full-face display screen 103, the user swaps sides of the device 100 to engage his/her chat session on the second screen 104 while allowing the advertisement to finish, and then swap back to the full-face display screen 103 watch the video when the desired content resumes play. In such implementations, for example, the device 100 can save power by dimming lighting of the unengaged screen, e.g., based on touch interaction by the user on the engaged screen and/or orientation information of the device.

In some embodiments, the dual display smartphone device 100 can include a protective case that can attach to the body of the device 100 and configured to cover both of the screens 103, 104 when the case in a closed position, and cover one of the screens 103 or 104 in an open position. For example, in the open position, the protective case can fold as a stand to prop the device 100 to present the first full-face display screen 103 in a position that is easy for a user to view while at least partially covering the second display screen 104 on the opposite side. For example, in this manner, the protective case can provide a stand that allows a user to focus on one of display (e.g., the first full-face display screen 103) and protect the other display (e.g., second display screen 104). In some implementations, the case can include open regions that expose certain components or areas of the device 100, e.g., on the second face 102, such as the camera 107, sensors 108 and/or 109, and/or fingerprint sensor/button 106.

Figure 6A:
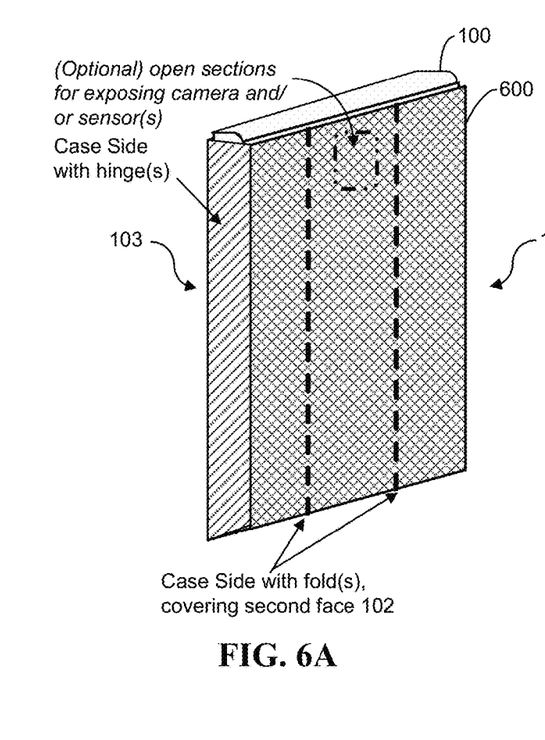
FIGS. 6A-6C show diagrams depicting an example embodiment of a protective case for an example dual display smartphone device in accordance with the present technology.
Figure 6B:
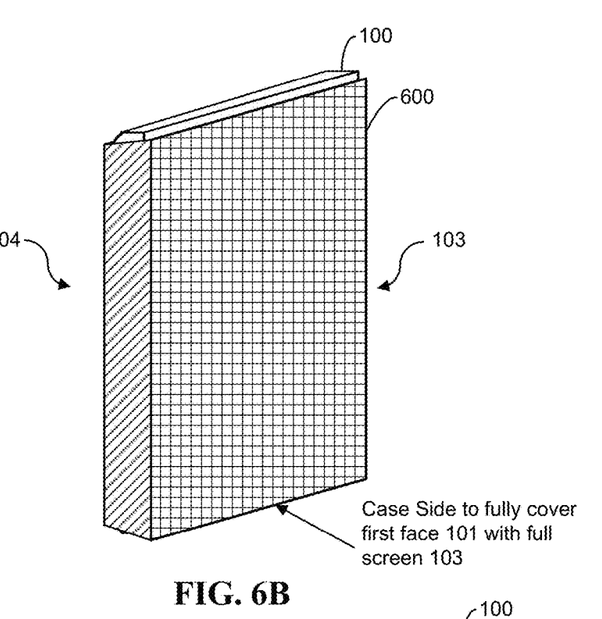
Figure 6C:
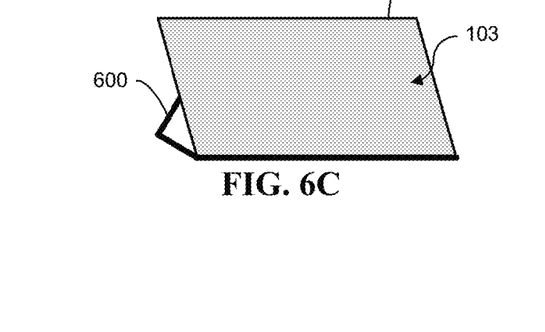

FIGS. 6A-6C show an example embodiment of a protective case 600 for the dual display smartphone device 100. FIGS. 6A and 6B show side-angled views of the example case 600 covering both sides of the dual display smartphone device 100, and FIG. 6C showing a side-angled view of the example dual display smartphone device 100 propped up for viewing the first full-face display screen 103 by the case 600 in a folded position.

Figure 7:
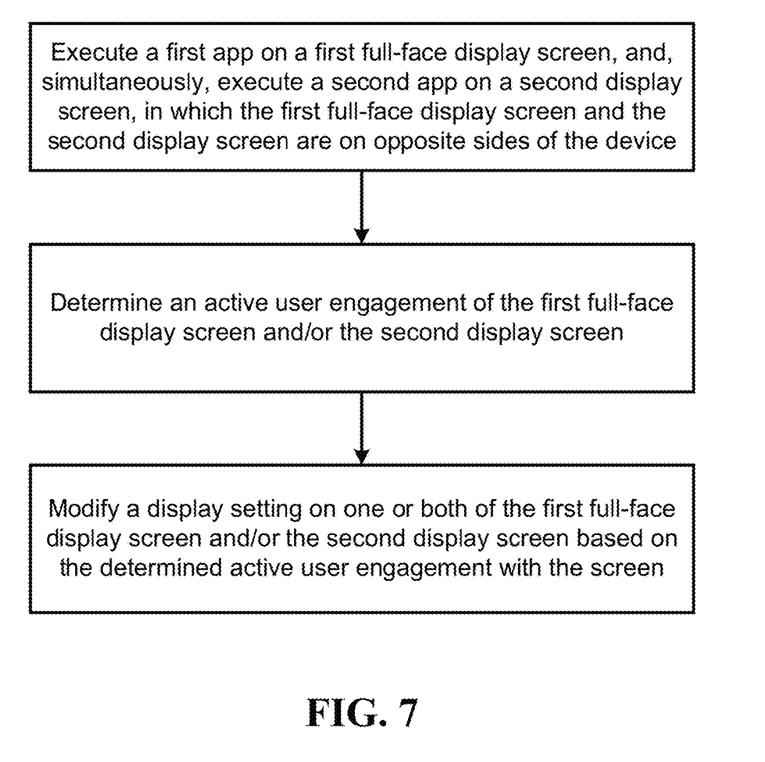
FIG. 7 shows a diagram of an example method for managing dual displays during screen swapping in accordance with the present technology.

FIG. 7 shows a diagram of an example method for managing dual displays during screen swapping for a dual screen smart device, such as the device 100. The method includes, executing, by the device 100, a first app on the first full-face display screen 103, and, simultaneously, executing a second app on a second display screen 104. The method includes determining, by the device 100, an active user engagement of the first full-face display screen 103 and/or the second display screen 104. In some implementations, the determined activity level of the user's engagement with one or both of the screens 103, 104 can include determining an amount of touch interactions and/or an orientation of the screen in space based on motion data acquired from motion sensors, light data acquired from optical sensors, and/or image data obtained from the camera. The method includes modifying, by the device 100, a display setting on one or both of the first full-face display screen 103 and/or the second display screen 104 based on the determined active user engagement of the user with one or both of the screens. For example, the device 100 can adjust a brightness parameter such as dimming the brightness of the screen when the user engagement is determined to be temporarily inactive. This can save power for the device 100 by dimming lighting of the unengaged screen. In such implementations, the device 100 can adjust the display setting without disrupting the normal implementation of the app associated with the inactive screen, and without requiring any user input to make such the power-saving adjustment. For example, the dual display smartphone device 100 is able to facilitate energy efficient screen swapping through implementations of the example method.

EXAMPLES

In some embodiments in accordance with the present technology (example 1), a dual display device includes a first display screen fixed in position on a first face of the device to occupy substantially 100% of the surface area of the first face without leaving a space for placing a camera or a sensor outside the first display screen on the first face, wherein the first display screen is structured to provide a high resolution, fully viewable visual display for displaying images and providing touch sensing operations; a second display screen fixed in position on a second face of the device to occupy less than 100% of the surface area of the second face to provide one or more surface areas on the second face for holding sensor devices including a camera for capturing photos and videos, wherein the second display screen is structured to provide a fully viewable visual display for displaying images and providing touch sensing operations; and a controller coupled to control operations of the device including displaying and touch sensing operations on the first and second display screens, the controller operable to provide touch sensing operations on the first and second display screens to control the camera on the second face by using the first display screen as a live viewfinder in capturing a photo or video by the camera in a point-and-shoot camera operation and by using the second display screen as a live viewfinder in capturing a photo or video by the camera in a selfie camera operation.

Example 2 includes the device of example 1, wherein the first display screen is structured on the first side without a bezel.

Example 3 includes the device of any of the preceding examples, wherein the first display screen has an aspect ratio ranging from 1.75:1 to 2.25:1.

Example 4 includes the device of any of the preceding examples, wherein the first display screen has a screen size in a range of 5.5" to 6.5".

Example 5 includes the device of any of the preceding examples, wherein the first display screen has a display resolution of at least 720×1280 pixels.

Example 6 includes the device of any of the preceding examples, wherein the second display screen has a screen size in a range of 3.5" to 5.5".

Example 7 includes the device of any of the preceding examples, wherein the first display screen and the second display screen are both color screens.

Example 8 includes the device of any of the preceding examples, wherein the first display screen and the second display screen are both LCD screens.

Example 9 includes the device of any of the preceding examples, wherein the first display screen and the second display screen are both OLED screens.

Example 10 includes the device of any of the preceding examples, wherein the first display screen and the second display screen are screens based on different screen designs.

Example 11 includes the device of any of the preceding examples, wherein the first display screen and the second display screen are screens with different screen resolutions or different screen brightness levels.

Example 12 includes the device of any of the preceding examples, wherein the second display screen is at least 50% of the surface area of the second side.

Example 13 includes the device of any of the preceding examples, further including one or more light sensors disposed in the one or more surface areas outside the second display screen on the second face to detect one or both of ambient and infrared light; and a light illuminator disposed in the one or more surface areas outside the second display screen on the second face proximate to the camera to project light outward from the second face.

Example 14 includes the device of any of the preceding examples, further including one or more speakers disposed on at least one side facet of the device positioned between the first face and the second face.

Example 15 includes the device of any of the preceding examples, further including one or more microphones disposed on at least one side facet of the device positioned between the first face and the second face.

Example 16 includes the device of any of the preceding examples, further including a fingerprint sensor located in the one or more surface areas outside the second display screen on the second face to sense fingerprints.

Example 17 includes the device of any of the preceding examples, further including a face imaging module disposed in the one or more surface areas outside the second display screen on the second face to detect a user's face to identify a user.

Example 18 includes the device of any of the preceding examples, further including a data processing unit including a processor and a memory, the data processing unit in communication with the first and second display screens and the camera.

Example 19 includes the device of any of the preceding examples, wherein the second display screen is operable to implement initial or basic functions of the device including unlocking the device using a fingerprint or a face identification recognition technique, conducting a phone call, and/or acquiring a selfie picture using the camera, and wherein the first display screen is operable to implement a visual display experience of a video, picture, and/or text on a full screen that completely occupies the surface area of the first side.

Example 20 includes the device of any of the preceding examples, wherein the device is operable to manage tasks adapted to the first display and the second display screens simultaneously, including controlling a viewing setting for the first display screen based on touch control of the second display screen without obstructing viewability of content on the high resolution, fully viewable visual display of the first display screen.

Example 21 includes the device of any of the preceding examples, wherein the device is a smartphone.

Example 22 includes the device of any of the preceding examples, wherein the device is a tablet.

Example 23 includes the device of any of the preceding examples, wherein the device is a portable computing device.

In some embodiments in accordance with the present technology (example 24), a method for enhancing a user experience in a portable device includes providing a first display screen fixed in position on a first face of the device to occupy substantially 100% of the surface area of the first face without leaving a space for placing a camera or a sensor outside the first display screen on the first face to provide a high resolution, fully viewable visual display for displaying images and to provide touch sensing operations; providing a second display screen fixed in position on a second face of the device to occupy less than 100% of the surface area of the second face to provide one or more surface areas on the second face for holding sensor devices including a camera for capturing photos and videos, wherein the second display screen is structured to provide a fully viewable visual display for displaying images and to provide touch sensing operations; activating the first display screen on the first face as a viewfinder for the camera on the second face to display a live view from the camera and as a touch sensing panel for a user to control the camera including composing a scene while adjusting the device to aim the camera on the second face towards a target object or area in capturing a photo or video in a point-and-shoot camera operation; and activating the second display screen on the second face as a viewfinder for the camera on the second face to display a live view from the camera and as a touch sensing panel for a user to control the camera including composing a scene while adjusting the device to aim the camera on the second face towards a target object or area in capturing a photo or video in a selfie camera operation.

Example 25 includes the method of example 24, including turning off the first display screen to save power during the selfie camera operation.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. The design in FIGS. 2A-2C may be implemented in smartphones, tablets, portable devices or other computing or communication devices.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A dual display device, comprising:
    a first display screen fixed in position on a first face of the device to occupy substantially 100% of the surface area of the first face without leaving a space for placing a camera or a sensor outside the first display screen on the first face, wherein the first display screen is structured to provide a high resolution, fully viewable visual display for displaying images and providing touch sensing operations;
    a second display screen fixed in position on a second face of the device to occupy less than 100% of the surface area of the second face to provide one or more surface areas on the second face for holding sensor devices including a camera for capturing photos and videos, wherein the second display screen is structured to provide a fully viewable visual display for displaying images and providing touch sensing operations; and
    a controller coupled to control operations of the device including displaying and touch sensing operations on the first and second display screens, the controller operable to provide touch sensing operations on the first and second display screens to control the camera on the second face by using the first display screen as a live viewfinder in capturing a photo or video by the camera in a point-and-shoot camera operation and by using the second display screen as a live viewfinder in capturing a photo or video by the camera in a selfie camera operation,
    wherein the device is operable to manage tasks adapted to the first display and the second display screens simultaneously, including controlling a viewing setting for the first display screen based on touch control of the second display screen without obstructing viewability of content on the high resolution, fully viewable visual display of the first display screen.

2. The device of claim 1, wherein the first display screen is structured on the first side without a bezel.

3. The device of claim 1, wherein the first display screen has an aspect ratio ranging from 1.75:1 to 2.25:1.

4. The device of claim 1, wherein the first display screen has a screen size in a range of 5.5" to 6.5".

5. The device of claim 1, wherein the first display screen has a display resolution of at least 720×1280 pixels.

6. The device of claim 1, wherein the second display screen has a screen size in a range of 3.5" to 5.5".

7. The device of claim 1, wherein the first display screen and the second display screen are both color screens.

8. The device of claim 1, wherein the first display screen and the second display screen are both LCD screens.

9. The device of claim 1, wherein the first display screen and the second display screen are both OLED screens.

10. The device of claim 1, wherein the first display screen and the second display screen are screens based on different screen designs.

11. The device of claim 1, wherein the first display screen and the second display screen are screens with different screen resolutions or different screen brightness levels.

12. The device of claim 1, wherein the second display screen is at least 50% of the surface area of the second side.

13. The device of claim 1, further comprising:
one or more light sensors disposed in the one or more surface areas outside the second display screen on the second face to detect one or both of ambient and infrared light; and
a light illuminator disposed in the one or more surface areas outside the second display screen on the second face proximate to the camera to project light outward from the second face.

14. The device of claim 1, further comprising:
one or more speakers disposed on at least one side facet of the device positioned between the first face and the second face.

15. The device of claim 1, further comprising:
one or more microphones disposed on at least one side facet of the device positioned between the first face and the second face.

16. The device of claim 1, further comprising:
a fingerprint sensor located in the one or more surface areas outside the second display screen on the second face to sense fingerprints.

17. The device of claim 1, further comprising:
a face imaging module disposed in the one or more surface areas outside the second display screen on the second face to detect a user's face to identify a user.

18. The device of claim 1, further comprising:
a data processing unit including a processor and a memory, the data processing unit in communication with the first and second display screens and the camera.

19. The device of claim 1, wherein the second face includes the second display screen and the sensor devices that are operable to implement initial or basic functions of the device including unlocking the device using a fingerprint or a face identification recognition technique, conducting a phone call, and acquiring a selfie picture using the camera, and wherein the first display screen is operable to implement a visual display experience of a video, picture or text on a full screen that completely occupies the surface area of the first side.

20. The device of claim 1, wherein the device is a smartphone.

21. The device of claim 1, wherein the device is a tablet.

22. The device of claim 1, wherein the device is a portable computing device.

23. A method for enhancing a user experience in a portable device, comprising:
providing a first display screen fixed in position on a first face of the device to occupy substantially 100% of the surface area of the first face without leaving a space for placing a camera or a sensor outside the first display screen on the first face to provide a high resolution, fully viewable visual display for displaying images and to provide touch sensing operations;
providing a second display screen fixed in position on a second face of the device to occupy less than 100% of the surface area of the second face to provide one or more surface areas on the second face for holding sensor devices including a camera for capturing photos and videos, wherein the second display screen is structured to provide a fully viewable visual display for displaying images and touch sensing operations;
activating the first display screen on the first face as a viewfinder for the camera on the second face to display a live view from the camera and as a touch sensing panel for a user to control the camera including composing a scene while adjusting the device to aim the camera on the second face towards a target object or area in capturing a photo or video in a point-and-shoot camera operation;
activating the second display screen on the second face as a viewfinder for the camera on the second face to display a live view from the camera and as a touch sensing panel for a user to control the camera including composing a scene while adjusting the device to aim the camera on the second face towards a target object or area in capturing a photo or video in a selfie camera operation; and
operating the first display and the second display screens simultaneously to manage user operations, including controlling a viewing setting for the first display screen based on touch control of the second display screen without obstructing viewability of content on the high resolution, fully viewable visual display of the first display screen.

24. The method of claim 23, comprising:
turning off the first display screen to save power during the selfie camera operation.

* * * * *